United States Patent [19]
Arnold

[11] Patent Number: 5,240,122
[45] Date of Patent: Aug. 31, 1993

[54] BICYCLE SUPPORT RACK

[75] Inventor: William D. Arnold, Florissant, Mo.

[73] Assignee: Lee Rowan Company, St. Louis, Mo.

[21] Appl. No.: 869,000

[22] Filed: Apr. 15, 1992

[51] Int. Cl.$^5$ .............................................. A47F 5/00
[52] U.S. Cl. ...................................... 211/19; 211/20; 211/106
[58] Field of Search ..................... 211/17, 18, 19, 20, 211/22, 87, 106, 90

[56] References Cited

U.S. PATENT DOCUMENTS

| D. 313,957 | 1/1991 | Martinell et al. | |
|---|---|---|---|
| 4,392,572 | 7/1983 | Bernard | 211/19 |
| 4,830,196 | 5/1989 | Csanady | 211/19 |
| 5,054,628 | 10/1991 | Allen | 211/18 X |
| 5,074,419 | 12/1991 | Smith | 211/17 |

*Primary Examiner*—Robert W. Gibson, Jr.
*Attorney, Agent, or Firm*—Rogers, Howell & Haferkamp

[57] ABSTRACT

A bicycle support rack generally comprises metal rod or wire elements welded together, including a single rod or wire element that is bent at its ends to form a pair of horizontally spaced rim hangers. Each rim hanger can removably support one bicycle off the ground by means of the rim of the front wheel. The rod or wire element that defines the rim hangers is also bent in its middle to form a shelf frame. A metal wire grill portion has outer edge margins joined to the shelf frame to define the surface of a shelf for supporting accessories like shoes, helmets and water bottles. Another single rod or wire element is bent to form a pair of segments for bracing the rim hangers. That last rod or wire element is also bent to form a pair of tire stops for urging the front wheels of two bicycles into alignment in vertical planes perpendicular to the wall. In addition, two metal wire grill portions are supported below the rim hangers by the metal wire element that defines the brace segments to protect the wall from tire marks from the front wheels.

26 Claims, 2 Drawing Sheets

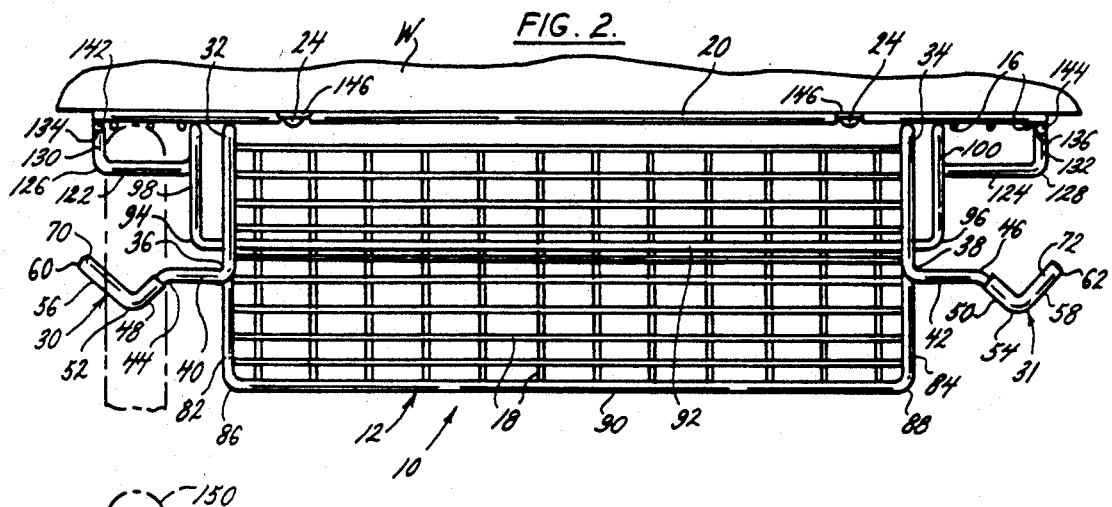
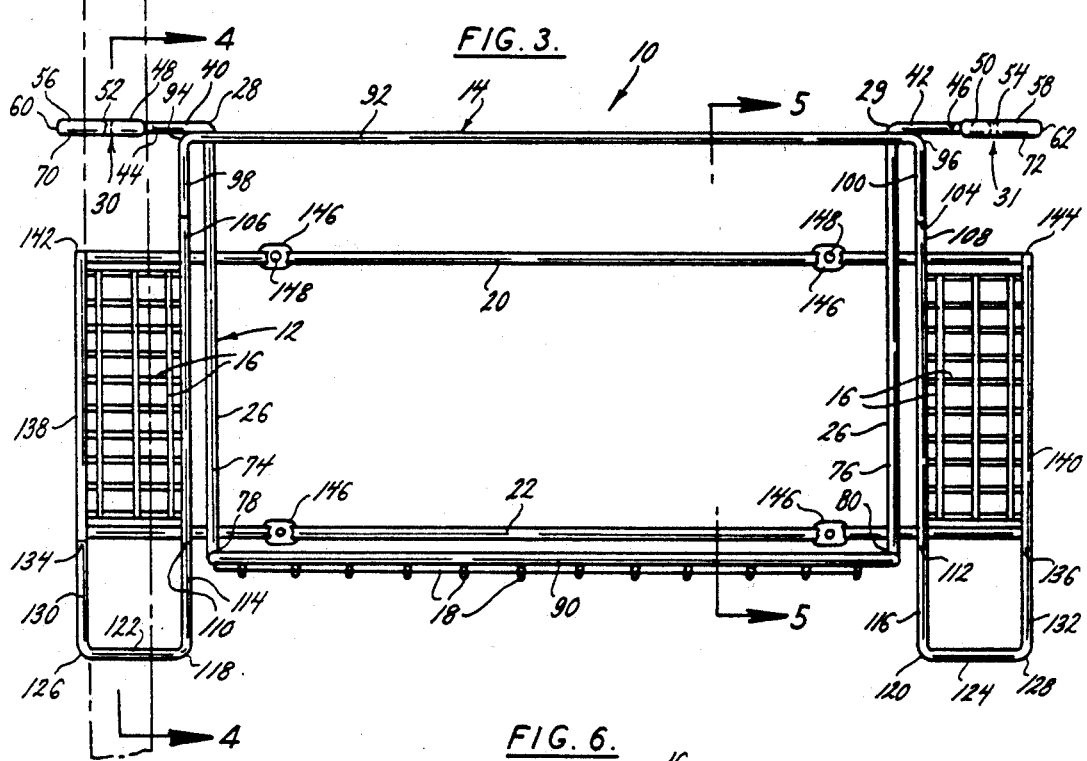
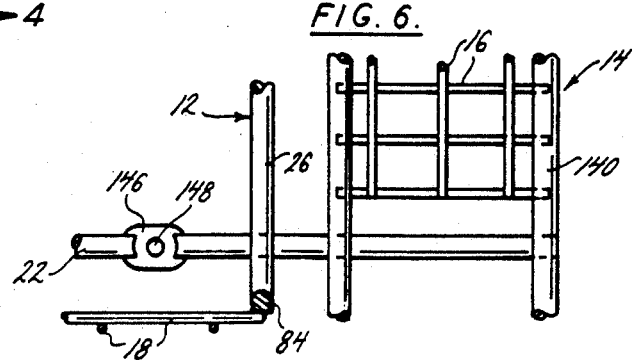

BICYCLE SUPPORT RACK

BACKGROUND AND SUMMARY OF THE INVENTION

The present invention relates to a bicycle support rack and particularly to a bicycle support rack for mounting to a wall and for removably supporting one or two bicycles off the ground by the rims of the front wheels.

Bicycle racks are well-known in the art. The known bicycle racks are made of metal wire and sheet elements rigidly fixed together with certain elements bent to form rim hangers. This kind of rim hanger projects forwardly from its wall support to a bent front end, and a finger projects laterally from and has its proximal end joined to that bent front end. This finger provides removable support for a bicycle by insertion of the finger through the spokes of the bicycle front wheel and provides surfaces upon which the rim can be supported so the bicycle can be stored against a wall and off the ground.

The bicycle support rack of this invention has advantages and is an improvement over the bicycle racks of the prior art. An advantage includes the provision of a fixed frame made of metal rod or wire elements welded together, a pair of horizontally spaced rim hangers formed from the opposite ends of a single U-shaped rod or wire element, and a pair of segments for bracing the rim hangers formed from another single rod or wire element. This fixed frame has proven to be advantageous because it is made of fewer and less costly rod or wire elements, and is fabricated according to less costly methods. In addition, this fixed frame is light weight and costs less to ship. Further advantages of this bicycle support rack include the provision of a shelf frame also formed from the U-shaped element, metal wire grill portions below each rim hanger for protecting the wall from rubber marks from the tire of the front wheel, and tire stops that urge the front wheel to align itself in a vertical plane perpendicular to the wall. These and more advantages are provided by the present invention without sacrificing strength, appearance or convenience of use.

In accordance with the present invention, a bicycle support rack generally comprises metal rod or wire elements welded together, including a single rod or wire element that is bent at its ends to form a pair of horizontally spaced rim hangers. Each rim hanger can removably support one bicycle off the ground by means of the rim of the front wheel. The rod or wire element that defines the rim hangers is also bent in its middle to form a shelf frame. A metal wire grill portion has outer edge margins joined to the shelf frame to define the surface of a shelf for supporting accessories like shoes, helmets and water bottles. Another single rod or wire element is bent to form a pair of segments for bracing the rim hangers. That last rod or wire element is also bent to form a pair of tire stops for urging the front wheels of two bicycles into alignment in vertical planes perpendicular to the wall. In addition, two metal wire grill portions are supported below the rim hangers by the metal rod or wire element that defines the brace segments to protect the wall from tire marks from the front wheels.

BRIEF DESCRIPTION OF THE DRAWINGS

FIG. 2 is an enlarged top plan view of the bicycle support rack with a section of a front wheel shown for illustrative purposes only.

FIG. 3 is an enlarged front elevation view of the bicycle support rack with a section of a front wheel shown for illustrative purposes only.

FIG. 6 is a sectional view, with portions broken away, taken generally along the lines 6—6 in FIG. 5.

DESCRIPTION OF THE PREFERRED EMBODIMENT

Figure 1:
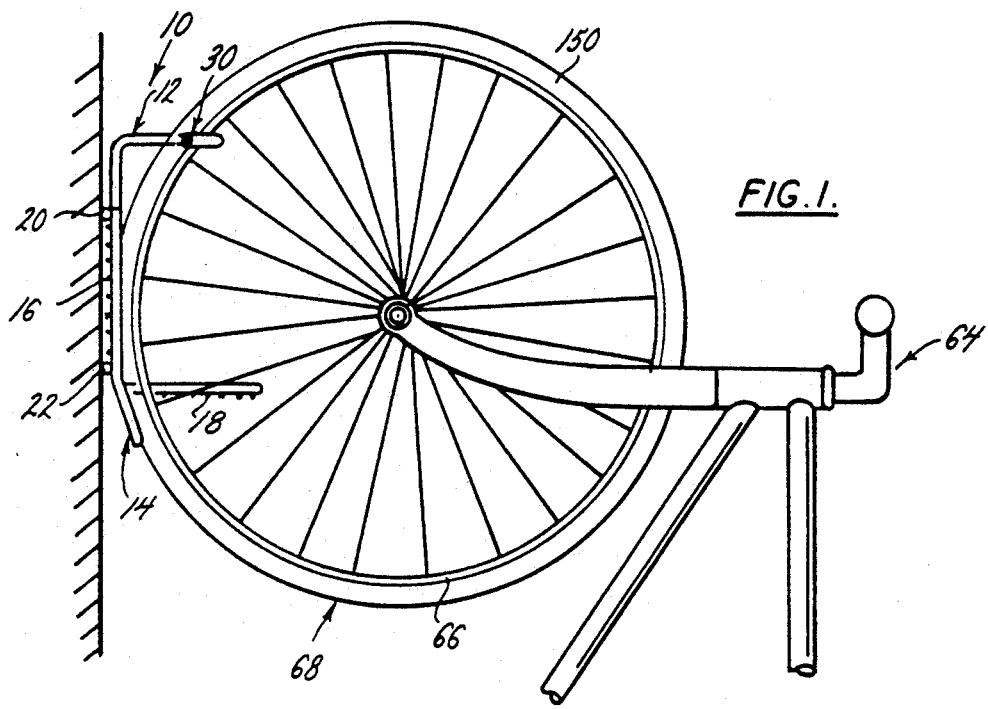
FIG. 1 is a side elevation view of the bicycle support rack of the present invention with a front wheel and sections of a bicycle shown to illustrate its support on the rack.

This bicycle support rack 10 generally comprises a unitary element 12 of metal rod or wire bent as will be described to form both a shelf frame and a pair of rim hangers, unitary element 14 of metal rod or wire bent as will be described to form tire stops and segments for bracing the rim hangers, two identical wall protectors 16 made of criss-crossed metal wires, and a shelf surface 18 likewise made of criss-crossed metal wires. The wall protectors 16 are welded to the brace element 14 while the shelf surface 18 is welded to the shelf frame of the rim hanger element 12. The rim hanger element 12 and the brace element 14 are welded to a pair of upper and lower horizontal metal rod or wire elements 20 and 22 and so enable the resulting integral bicycle support rack 10 to be attached to a wall W, or like mounting structure, by screws 24, or like fasteners.

The metal rod or wire element 12 that defines both a shelf frame and a pair of rim hangers generally comprises a U-shaped segment 26 (as viewed in FIG. 3) with opposite, left and right upper arm bends 28 and 29. The rim hangers 30 and 31 generally comprise rod or wire fingers 32 and 34 (FIG. 2) that extend forwardly from and have rearward ends joined to the upper arm bends 28 and 29, and end at forward bends 36 and 38. Generally horizontal lateral sections 40 and 42 extend outwardly from the forward bends 36 and 38, and end at outward bends 44 and 46. Generally horizontal inner tapered sections 48 and 50 extend outwardly and forwardly from the outward bends 44 and 46, and end at front bends 52 and 54. And generally horizontal outer tapered sections 56 and 58 extend outwardly and rearwardly from the front bends 52 and 54, and have terminal back ends 60 and 62. Thus, these sections of the rod or wire element 12 form the pair of horizontally spaced rim hangers 30 and 31 which removably support a bicycle 64 by insertion of the rim hangers 30 and 31 through the spokes of the front wheel 68 and so provide surface portions upon which the rim 66 can be supported, as generally illustrated in FIGS. 1 and 2. To protect the rim 66 from scratches, the inner and outer tapered sections 48 and 50, 56 and 58 are generally covered by protective boots 70 and 72, made of neoprene rubber or the like, as generally illustrated in FIG. 2.

The U-shaped rod or wire segment 26 further comprises vertical arms 74 and 76 which end at lower arm bends 78 and 80. The vertical arms 74 and 76 extend across and are disposed on the upper and lower rod or wire elements 20 and 22 as illustrated in FIG. 3, and all are welded together at these places. In addition, the rod or wire element 12 has horizontal side shelf frame segments 82 and 84 (FIG. 2), that extend forwardly from the lower arm bends 78 and 80, and end at forward bends 86 and 88. A front shelf frame segment 90 extends between and has opposite ends joined to the forward bends 86 and 88. The grill portion 18 that defines a shelf surface extends between and has outer edges welded to the shelf frame segments 90, 82 and 84. This shelf is for storing cycling accessories like shoes, helmets, water bottles, and so on.

The rod or wire element 14 that defines the brace segments includes a generally horizontal transverse section 92 which has opposite end bends 94 and 96 and is welded to the rod or wire sections 32 and 34 of the rim hangers 30 and 31 at their crossing points. Upper inclined sections 98 and 100 extend rearwardly and downwardly from the bends 92 and 94, and end at rearward bends 102 and 104. Inner vertical sections 106 and 108 extend downwardly from the rearward bends 102 and 104 to downward bends 110 and 112 and are welded to the upper and lower horizontal rod or wire elements 20 and 22 at their crossing points. Inner and lower inclined sections 114 and 116 extend downwardly and forwardly from the downward bends 110 and 112 to lower bends 118 and 120. Horizontal and lateral sections 122 and 124 extend outwardly from the lower bends 118 and 120 to outward bends 126 and 128, and function as tire stops. Outer and lower inclined sections 130 and 132 extend upwardly and rearwardly from the outward bends 126 and 128 to upper bends 134 and 136. Outer vertical sections 138 and 140 extend upwardly from the upper bends 134 and 136, and have terminal upward ends 142 and 144. These vertical rod or wire sections 138 and 140 are welded to the ends of the horizontal rod or wire elements 20 and 22 at their crossing points.

These relationships and welded connections between brace element 14 and the rim hanger element 12 permits the gauges of the rods or wires which constitute elements 12 and 14 to be smaller than otherwise would be possible.

The upper and lower horizontal rod or wire elements 20 and 22 are vertically spaced and are generally parallel to one another. These rod or wire elements 20 and 22 each have a pair of flat portions 146 which are vertically aligned with those of the other element, and are provided with a pair of fastener holes 148 through the flat portions 146, which are likewise vertically coordinated. The pair of fastener holes 148 are disposed on the upper and lower rod or wire elements 20 and 22 with about sixteen (16) inches between centers. Thus the fastener holes 148 are so horizontally spaced as to permit the location of screws 24 on standard wall studs (not shown).

Figure 4:
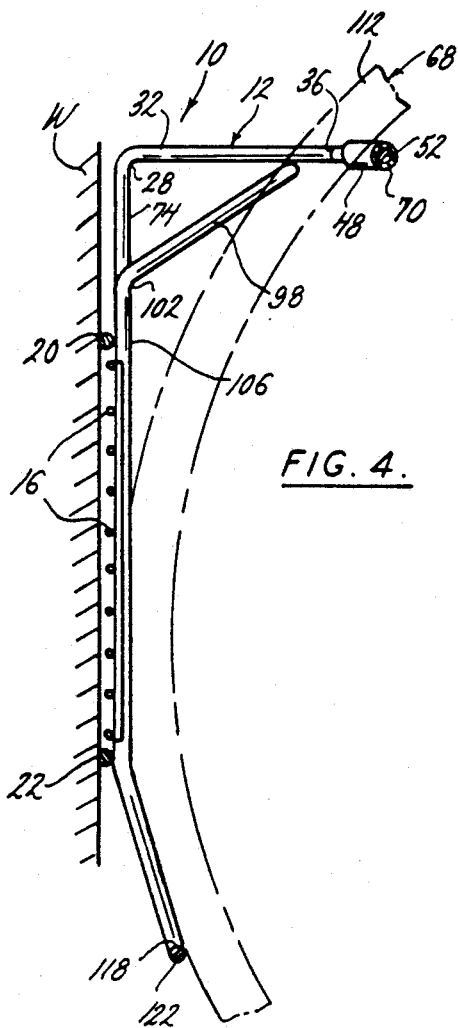
FIG. 4 is a sectional view taken generally along the line 4—4 in FIG. 3 with a section of a front wheel shown for illustrative purposes only.
Figure 5:
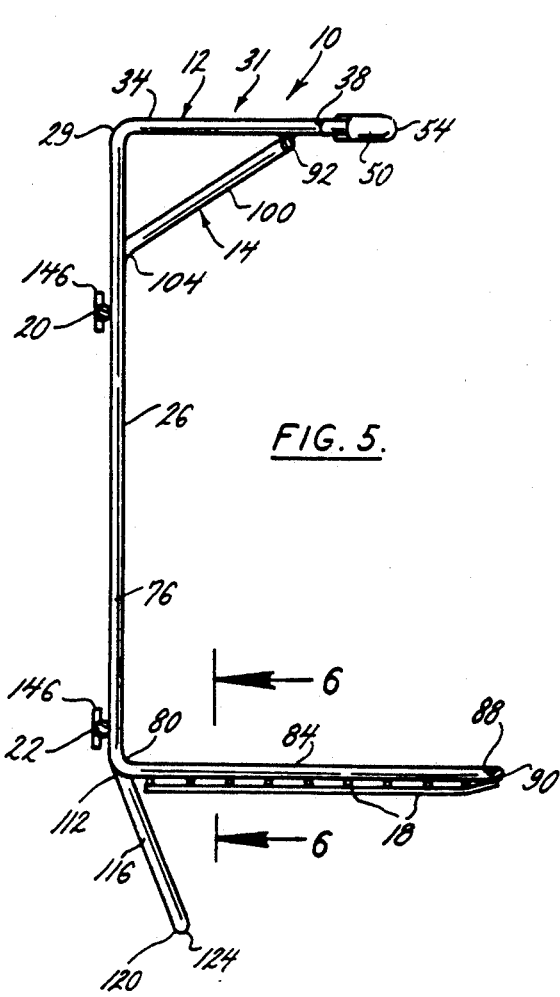
FIG. 5 is a sectional view taken generally along the line 5—5 in FIG. 3.

The pair of horizontal and lateral sections 122 and 124 of the rod or wire element 14 are spaced out from the wall W and below the rim hangers 30 and 31 of the rod or wire element 12, and so are positioned to act as tire stops for the tire 150 of the front wheel 68 (See FIGS. 1 and 4). These tire stop sections 122 and 124 urge the front wheel 68, and hence the entire bicycle 64, to align itself in a vertical plane perpendicular to the wall W. In addition, the tire stop sections 122 and 124 stop the forward pivot of a front wheel 68 when pivoted from the rim hangers 30 and 31 of rod or wire element 12 by means of pressure engagement between a tire stop, 122 or 124, and the tire 150, as illustrated in FIG. 4. And still further, the tire stops 122 and 124 support most conventionally sized tires so that the tire 150 is spaced apart from the wall protectors 16. To achieve this object for a range of several sizes of tires, the tire stops 122 and 124 have to be accordingly configured with respect to the smallest diameter tire in that range.

The identical grill portions that define wall protectors 16 extend between and have left and right edge margins welded to the inner and outer vertical sections 106 and 138, 108 and 140 of the rod or wire element 14, and generally protect the wall W from being smudged by the rubber of the tire 150 of front wheel 68.

While the present invention has been described by reference to a specific embodiment, it should be understood that modifications and variations of the invention may be constructed without departing from the scope of the invention defined in the following claims.

What is claimed is:

1. A bicycle support rack for attaching to a wall, comprising:
   a unitary retainer rod or wire having a middle portion merged with two end portions;
   a rim engageable hook section formed in each end portion for removably supporting a bicycle off the ground by the rim of the front wheel; and
   attaching means securely supporting the unitary retainer rod or wire for attaching the support rack to the wall; wherein the unitary retainer rod or wire is a metal rod or wire; and
   the attaching means comprises metal rod or wire elements welded to the unitary retainer rod or wire.

2. A bicycle support rack for attaching to a wall, comprising:
   a unitary retainer rod or wire having a middle portion merged with two end portions;
   a rim engageable hook section formed in each end portion for removably supporting a bicycle off the ground by the rim of the front wheel; and
   attaching means securely supporting the unitary retainer rod or wire for attaching the support rack to the wall;
   wherein the middle portion of said unitary retainer rod or wire defines a shelf frame.

3. The bicycle support rack of claim 2 wherein the middle portion comprises a pair of generally vertical sections which extend downwardly to lower bends; and
   said shelf frame includes a pair of side sections and a front section wherein the side sections extend forwardly from and are joined to the lower bends; and
   said front section is spaced from the vertical sections by said side sections.

4. The bicycle rack of claim 2 further comprising:
   a brace rod or wire securely supported by the unitary retainer rod or wire and having segments extending between the rim-engaging hook sections and the attaching means.

5. The bicycle support rack of claim 4 wherein the brace rod or wire includes two segments which comprise:
   first portions beneath and in supporting contact with the rim-engaging hook sections,
   second portions securely supported by the attaching means, and
   third portions extending rearwardly and downwardly from the first portions to the second portions.

6. The bicycle support rack of claim 5 wherein the brace rod or wire further comprises tire-bracing segments below said rim-engaging hook sections for urging the front wheels of removably supported bicycles into alignment in vertical planes generally perpendicular to the face of the wall.

7. The bicycle support rack of claim 6 further comprising tire-contacting means supported by the brace rod or wire for blocking contact between the wall and the tires of front wheels of removably supported bicycles.

8. The bicycle support rack of claim 6 wherein the brace rod or wire is a single metal rod or wire.

9. The bicycle support rack of claim 8 wherein the unitary retainer rod or wire is a metal rod or wire; and
the attaching means comprises metal rod or wire elements welded to the unitary retainer rod or wire.

10. The bicycle support rack of claim 9 wherein the supporting contact between the brace rod or wire and the unitary retainer rod or wire includes welded joints.

11. The bicycle support rack of claim 10 wherein the tire-bracing segments are generally horizontal sections of the brace rod or wire.

12. The bicycle support rack of claim 11 wherein the tire-contacting means comprise portions of crisscrossed metal wires which have edges welded along sections of the brace rod or wire.

13. The bicycle support rack of claim 12 wherein the attaching means comprises at least one horizontal metal wire element which is provided with fastener holes.

14. The bicycle support rack of claim 13 wherein said fastener holes are horizontally spaced apart with about sixteen inches between centers.

15. A bicycle support rack for attaching to a wall, comprising:
a unitary retainer rod or wire having a middle portion merged with two end portions;
a rim engageable hook section formed in at least one end portion for removably supporting a bicycle off the ground by the rim of the front wheel;
attaching means securely supporting the unitary retainer rod or wire for attaching the support rack to the wall; and
a unitary brace rod or wire having an inclined segment extending between and securely contacting the rim-engaging hook section and attaching means, and a tire-bracing segment oriented below the rim-engaging hook section for engaging the front wheel of a removably supported bicycle into alignment in a vertical plane generally perpendicular to the face of the wall.

16. The bicycle support rack of claim 15 wherein the tire-bracing segment supports the tire of a front wheel of a removably supported bicycle such that the tire is spaced apart from the wall.

17. The bicycle support rack of claim 15 wherein the attaching means comprises metal rod or wire elements; both the retainer rod or wire and the brace rod or wire are metallic; and
the secure contacts and support include welded joints.

18. The bicycle support rack of claim 15 wherein the retainer rod or wire further includes an additional rim engageable hook section formed in its other end portion; and
the brace rod or wire further includes an additional inclined segment and tire-bracing segment below said additional hook section.

19. The bicycle support rack of claim 18 wherein the tire-bracing segments are generally horizontal segments.

20. The bicycle support rack of claim 18 wherein the inclined segments space the tire-bracing segments from the wall such that a wheel contacts only a hook section and a tire-bracing segment when a bicycle is hung from the support rack.

21. A bicycle support rack comprising:
a unitary retainer rod or wire having a central portion between two end portions;
attaching means associated with the central portion for attaching the support rack to a wall; and
a rim engageable hook section formed in each end portion;
said support rack providing two bicycles with removable support off the ground; each hook section providing removable engagement with the rim of one wheel of one bicycle as the other wheel of said one bicycle is positioned therebelow.

22. The bicycle support rack of claim 21 wherein the central portion of said unitary rod or wire defines a shelf frame.

23. The bicycle support rack of claim 22 wherein the central portion comprises a pair of generally vertical sections which extend downwardly to lower bends; and
said shelf frame includes a pair of side sections and a front section wherein the side sections extend forwardly from and are joined to the lower bends; and said front section is spaced from the vertical sections by said side sections.

24. The bicycle support rack of claim 21 further comprising a brace rod or wire securely supported by the unitary retainer rod or wire and having segments extending between the rim-engaging hook sections and the attaching means.

25. The bicycle support rack of claim 24 wherein the brace rod or wire further comprises tire-bracing segments below said rim-engaging hook sections for urging the removably engaged wheels of removably supported bicycles into alignment in vertical planes generally perpendicular to the face of the wall.

26. The bicycle support rack of claim 21 wherein the unitary retainer rod or wire is a metal rod or wire; and
the attaching means comprises metal rod or wire elements welded to the unitary retainer rod or wire.

* * * * *